(12) United States Patent
Bose et al.

(10) Patent No.: US 8,255,531 B2
(45) Date of Patent: Aug. 28, 2012

(54) METHOD AND APPARATUS FOR PROVIDING MOBILE DEVICE INTEROPERABILITY

(75) Inventors: Raja Bose, Palo Alto, CA (US); Jorg Brakensiek, Mountain View, CA (US); Keun-Young Park, Palo Alto, CA (US)

(73) Assignee: Nokia Corporation, Espoo (FI)

( * ) Notice: Subject to any disclaimer, the term of this patent is extended or adjusted under 35 U.S.C. 154(b) by 247 days.

(21) Appl. No.: 12/827,919

(22) Filed: Jun. 30, 2010

(65) Prior Publication Data

US 2010/0332654 A1 Dec. 30, 2010

Related U.S. Application Data

(60) Provisional application No. 61/221,845, filed on Jun. 30, 2009.

(51) Int. Cl.
*G06F 15/173* (2006.01)
*H04W 40/00* (2009.01)

(52) U.S. Cl. ...... 709/224; 709/203; 709/227; 455/422.1; 345/620; 345/629; 345/505; 345/611; 345/555; 725/151; 725/37

(58) Field of Classification Search .................. 709/224, 709/203, 227
See application file for complete search history.

(56) References Cited

U.S. PATENT DOCUMENTS

| | | | |
|---|---|---|---|
| 5,134,697 A | 7/1992 | Scheffler | |
| 7,109,997 B1 * | 9/2006 | Callahan et al. | 345/555 |
| 7,260,624 B2 | 8/2007 | Sivertsen | |
| 2002/0180757 A1 * | 12/2002 | Duerr et al. | 345/620 |
| 2004/0093432 A1 | 5/2004 | Luo | |
| 2004/0183806 A1 * | 9/2004 | Marion et al. | 345/542 |
| 2005/0012679 A1 | 1/2005 | Karlov | |
| 2005/0132055 A1 | 6/2005 | Neogi | |
| 2007/0279389 A1 | 12/2007 | Hoch | |
| 2008/0057929 A1 | 3/2008 | Min | |
| 2008/0095151 A1 | 4/2008 | Kawazoe et al. | |
| 2009/0059512 A1 | 3/2009 | Lydon | |
| 2010/0279678 A1 * | 11/2010 | Li et al. | 455/422.1 |

FOREIGN PATENT DOCUMENTS

| | | |
|---|---|---|
| EP | 1262939 A1 | 12/2002 |
| WO | 9916044 A1 | 4/1999 |
| WO | 2006058051 A2 | 6/2006 |

OTHER PUBLICATIONS

International Search Report and Written Opinion, received in corresponding Patent Cooperation Treaty Application No. PCT/IB2010/001594. Dated Oct. 18, 2010. 11 pages.

* cited by examiner

*Primary Examiner* — Jude Jean Gilles
(74) *Attorney, Agent, or Firm* — Nokia Inc.

(57) ABSTRACT

An apparatus for providing mobile device interoperability with other devices may include at least one processor and at least one memory including computer program code. The at least one memory and the computer program code may be configured, with the processor, to cause the apparatus to perform at least receiving a frame buffer update request from a remote environment, determining a scan interval defining a first portion of the frame buffer over which scanning to determine data changes is to occur and a second portion over which scanning to determine data changes is not to occur, identifying whether a data change occurs in the first portion of the frame buffer by comparing relatively newer data to relatively older data, and updating a selected portion of the frame buffer to the remote environment based on the identifying. A corresponding method and computer program product are also provided.

20 Claims, 6 Drawing Sheets

METHOD AND APPARATUS FOR PROVIDING MOBILE DEVICE INTEROPERABILITY

CROSS REFERENCE TO RELATED APPLICATION

This application claims the benefit of U.S. Provisional Application No. 61/221,845, filed Jun. 30, 2009, the contents of which are incorporated herein in their entirety.

TECHNOLOGICAL FIELD

Embodiments of the present invention relate generally to network communication technology and, more particularly, relate to a method, apparatus and computer program product for providing mobile device interoperability with other devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to provision of information sharing in various networks. Although there are numerous types of networks that may be utilized for sharing information, it is becoming more popular recently to share information via smart or intelligent environments/networks.

An environment in which devices are easily able to enter and leave the network with little configuration is sometimes known as a "smart space". In an ideal smart space, users may enter into an environment and join the network to share or use resources relatively small configuration set up overhead that requires extensive user involvement. Some smart spaces are classified as decentralized networks that may generally be considered as networks that operate in a distributed environment rather than a centralized control environment. Thus, network resources such as processors, memory, switching devices, etc., may be distributed throughout the network instead of being centralized at one location (e.g., a server or server bank). As such, for example, various devices may come and go from the network at random times and thus their resources may be available in relatively unpredictable ways. Moreover, there may not be a single high powered server with relatively unlimited resources to devote to providing interoperability of the smart space devices. Thus, it may be desirable to develop a mechanism for providing improvements in relation to interoperability of devices in smart spaces.

BRIEF SUMMARY OF SOME EXAMPLE EMBODIMENTS OF THE INVENTION

A method, apparatus and computer program product are therefore provided to enable providing device interoperability including mobile devices. Moreover, for example, some embodiments may provide for adaptively reducing processing overhead in relation to mobile device interoperability.

In an example embodiment, an apparatus for providing mobile device interoperability with other devices is provided. The apparatus may include at least one processor and at least one memory including computer program code. The at least one memory and the computer program code may be configured, with the processor, to cause the apparatus to perform at least receiving a frame buffer update request from a remote environment, determining a scan interval defining a first portion of the frame buffer over which scanning to determine data changes is to occur and a second portion over which scanning to determine data changes is not to occur, identifying whether a data change occurs in the first portion of the frame buffer by comparing relatively newer data to relatively older data, and updating a selected portion of the frame buffer to the remote environment based on the identifying.

In another example embodiment, a method for providing mobile device interoperability with other devices is provided. The method may include receiving a frame buffer update request from a remote environment, determining a scan interval defining a first portion of the frame buffer over which scanning to determine data changes is to occur and a second portion over which scanning to determine data changes is not to occur, identifying whether a data change occurs in the first portion of the frame buffer by comparing relatively newer data to relatively older data, and updating a selected portion of the frame buffer to the remote environment based on the identifying.

In an example embodiment, a computer program product for providing mobile device interoperability with other devices is provided. The computer program product may include at least one computer-readable storage medium having computer-executable program code portions stored therein. The computer-executable program code portions may include program code portions for receiving a frame buffer update request from a remote environment, determining a scan interval defining a first portion of the frame buffer over which scanning to determine data changes is to occur and a second portion over which scanning to determine data changes is not to occur, identifying whether a data change occurs in the first portion of the frame buffer by comparing relatively newer data to relatively older data, and updating a selected portion of the frame buffer to the remote environment based on the identifying.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

Figure 5:
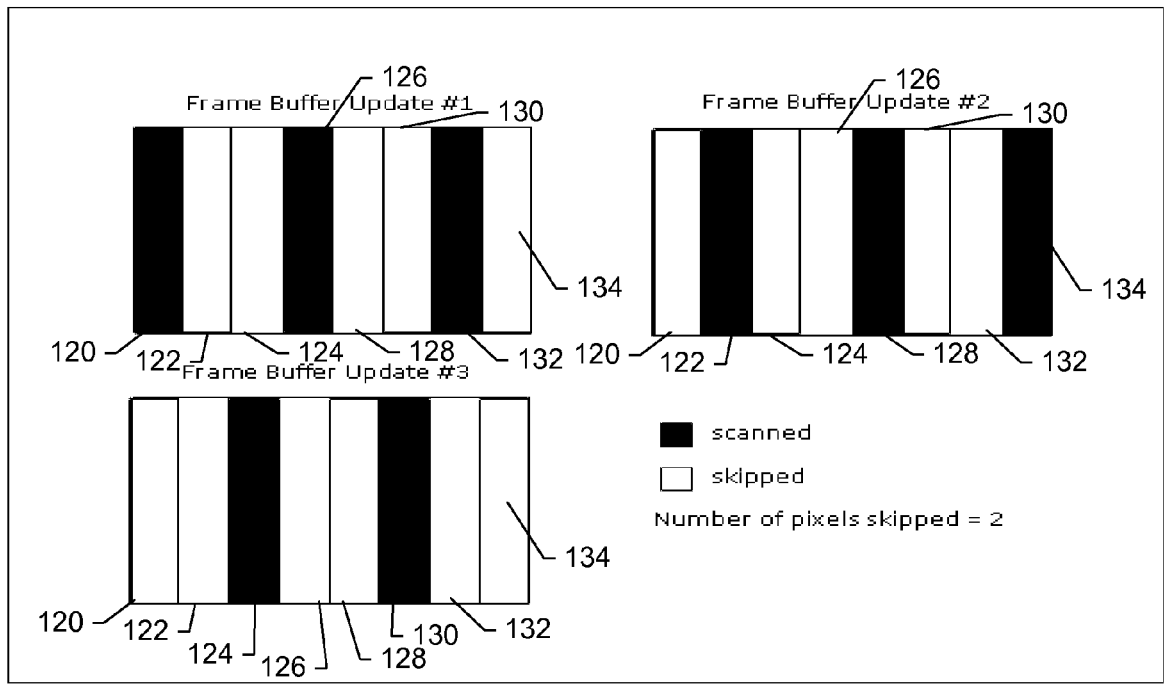
Figure 6:
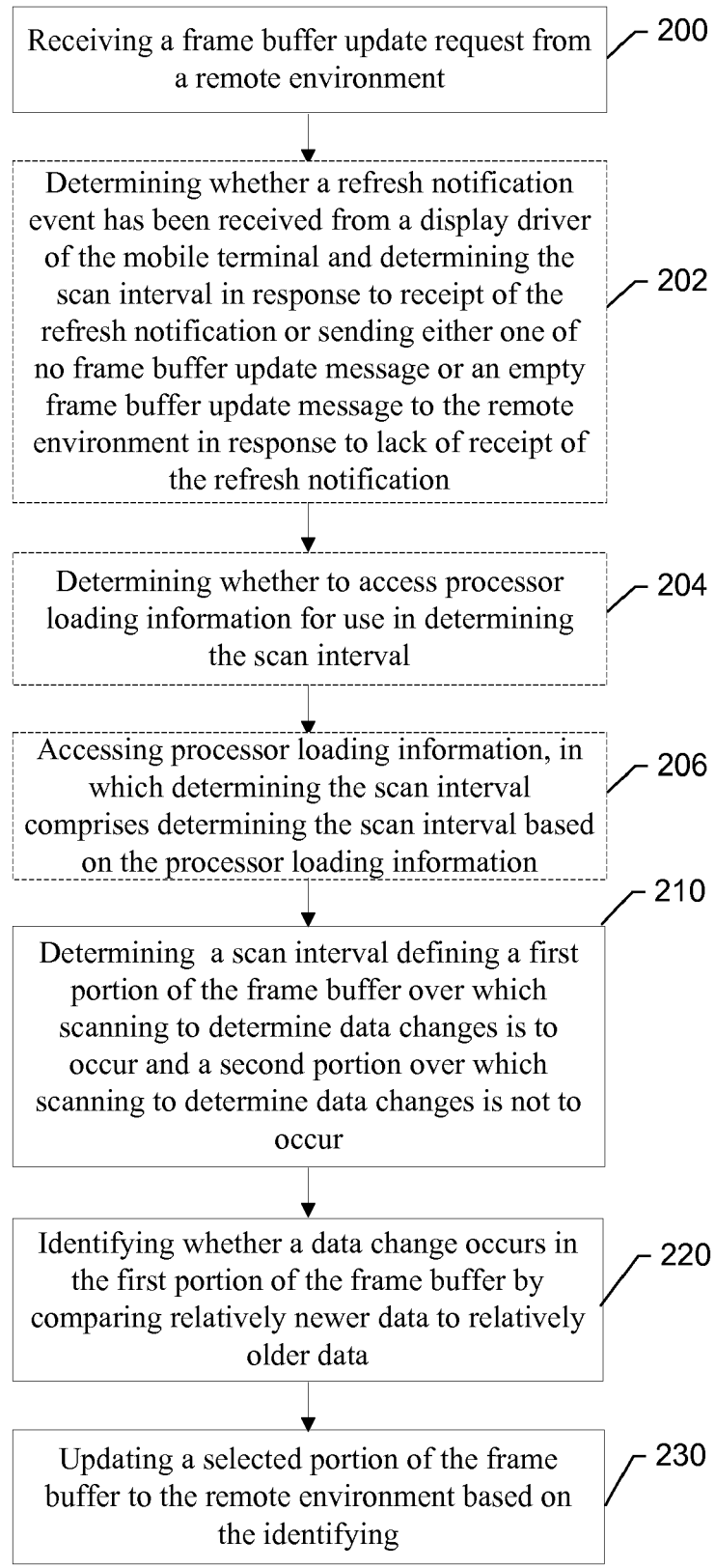

FIG. 5 is a diagram illustrating implementation of a skip interval with respect to frame buffer scanning according to an exemplary embodiment of the present invention; and FIG. 6 is a flowchart according to an exemplary method for providing mobile device interoperability according to an exemplary embodiment of the present invention from the perspective of a participant device in a distributed network.

DETAILED DESCRIPTION OF SOME EMBODIMENTS OF THE INVENTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Embodiments of the present invention may provide a mechanism by which mobile device interoperability may be provided in an environment that may adaptively reduce processing overhead. In relation to mobile device interoperability, some embodiments of the present invention may enable mobile devices to seamlessly become a part of another intelligent environment (for example, a vehicle head unit, meeting room, home living room etc.) whenever the person carrying the mobile device physically enters into the intelligent space. As a consequence, the features and capabilities of the mobile device may be projected onto the space and appear as if they are inherent capabilities of the intelligent environment itself (which may be hereinafter interchangeably referred to as, smart space, remote environment, or remote client). Part of the projection of device capabilities onto the smart space involves exporting the user interface (UI) screen and command and control capabilities of the mobile device to the smart space whereby, the user can comfortably interact and use resources of the mobile device via the remote environment.

One way to project the UI of the mobile device to the remote environment may be by copying data in a frame buffer of the mobile device to a frame buffer of or accessible to another device of the smart environment. To date, in a typical smart space scenario involving export of a mobile device UI, most improvement efforts have been made to reduce the network overhead during the transmission of the mobile device frame buffer to the remote environment (as opposed to reducing the processing overhead). The processing overhead during exporting of device UI to a remote environment typically occurs during the frame buffer analysis and comparison stages where a device (e.g., a server device) decides which parts of the frame buffer have been updated and therefore need to be transmitted to the client-side in order to project the UI to the client-side. Often, frame buffer analysis is done by traversing through the entire frame buffer and comparing each frame with a previous one in order to determine areas which have to be updated. After differences are determined, a reduction of network overhead may be accomplished as only those parts of the display screen that have changed may be transmitted. However, this is done at the cost of increased processing overhead in order to determine the portions that have been updated.

Network overhead reduction techniques work well when the server device has robust computing capabilities. However, in a smart space where, for example, the device acting as the server has more limited capabilities, implementing network overhead reduction techniques by increasing processing overhead may result in performance reductions. In this regard, for example, in cases involving mobile device interoperability, the mobile device may itself be acting as the server in many cases. Thus, given that relative to many personal computers (PCs) or servers the mobile device has relatively significant limitations in its processing capabilities, the reduction of network overhead may increase processing overhead to the point where noticeable performance losses are detectable. In this regard, for example, due to the relatively low processing capability and small memory of many mobile devices, a relatively large number of server programs are designed to run on mobile devices as single threaded applications. In such cases, high frame buffer processing overhead can have a significant impact on latency in providing display updates and/or latency in command and control by a remote user. In relation to latency in providing display updates, if the frame buffer processing overhead is high, any changes to the mobile device's screen may be communicated with a higher latency to the remote environment, since the frame buffer has to be analyzed and compared before the server can decide which parts to transmit to the remote environment. Meanwhile, in relation to latency in command and control by remote users, users attempting to remotely control the mobile device may see a large latency between the time they issue a control command (for example, a mouse click or keyboard event) and the time when it is finally executed by the server device (e.g., the mobile device). The latency may be due to the fact that since the server device is only running as a single thread of execution, it has to complete all of the prior frame buffer processing requests in its queue before it can move on to executing the control commands. This may occur since the frequency of frame buffer update requests from the remote client may often be much higher than the number of control commands being sent due to user action.

In other use cases involving mobile device interoperability where the network connection is done over broadband wired solutions such as high-speed Universal Serial Bus (USB), the processing overhead at the server may become a major bottleneck as compared to the network overhead. Hence, in such cases reducing the network overhead will have lower or negligible utility. In fact, if the system in such cases utilizes data compression or other image processing techniques, reducing network overhead may actually hinder rather than help the user experience since the higher processing overhead due to compression may lead to larger latency in providing display updates and executing incoming control commands. Additionally, as mobile devices start having larger displays such a Wide Video Graphics Array (WVGA) (800×480) and Super Video Graphics Array (SVGA) (800×600), the processing required for traversing the frame buffer increases significantly and may lead to longer processing delays before the mobile device may provide a response to an update request from the remote environment.

For the reasons described above and potentially other reasons as well, minimizing or at least reducing the processing overhead may become desirable in order to provide a high quality user experience in mobile device interoperability use cases. Some embodiments of the present invention may address the problem how to reduce frame buffer processing overhead at the server device (e.g., the mobile device in a smart space). In this regard, some embodiments of the present invention may improve the user experience and also focus on reducing processing overhead in use cases where processing capability is a potential bottleneck as opposed to networking resources. In an exemplary embodiment, an adaptive mechanism for reducing frame buffer processing overhead is provided to reduce latency of UI updates and command and control communications to make the user experience encountered via the remote environment closer and nearly the same as the user experience encountered while physically operating the mobile device itself.

Figure 1:
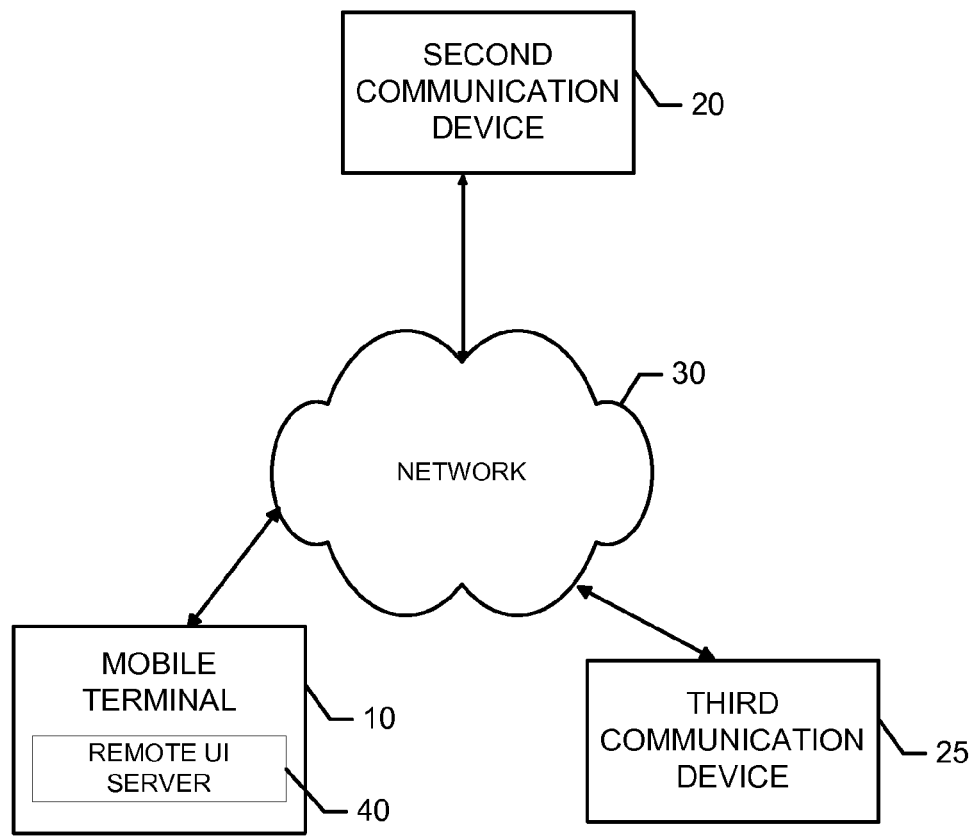
FIG. 1 illustrates a schematic block diagram of a system for providing mobile device interoperability according to an exemplary embodiment of the present invention.

FIG. 1 illustrates a generic system diagram in which a device such as a mobile device (e.g., mobile terminal 10), which may benefit from embodiments of the present invention, is shown in an exemplary communication environment. As shown in FIG. 1, an embodiment of a system in accordance with an example embodiment of the present invention may include a first communication device (e.g., mobile terminal 10) and a second communication device 20 capable of communication with each other via a network 30. In some cases, embodiments of the present invention may further include one or more additional communication devices (e.g., third communication device 25, which may be an example to illustrate potential multiplicity with respect to instances of other devices like the second communication device 20). In some embodiments, not all systems that employ embodiments of the present invention may comprise all the devices illustrated and/or described herein. While several embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video player, radio, global positioning system (GPS) devices, or any combination of the aforementioned, and other types of voice and text communications systems, can readily employ embodiments of the present invention. Furthermore, devices that are not mobile may also readily employ embodiments of the present invention.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. In some embodiments, the network 30 may be a peer-to-peer (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as wideband code division multiple access (W-CDMA), CDMA2000, Global System for Mobile Communications (GSM), General Packet Radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an exemplary embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an exemplary embodiment, one of the devices in the network (e.g., the mobile terminal 10) may be selected as or otherwise operate as a master device (e.g., a server device). The master device may be nominated and/or selected based on any suitable practice for determining a master device (e.g., the device with the greatest capability, greatest processing power, and/or the like). The master device may include a remote UI server 40 according to an exemplary embodiment. The remote UI server 40 may be configured to adaptively reduce processing overhead as described herein.

Figure 2:
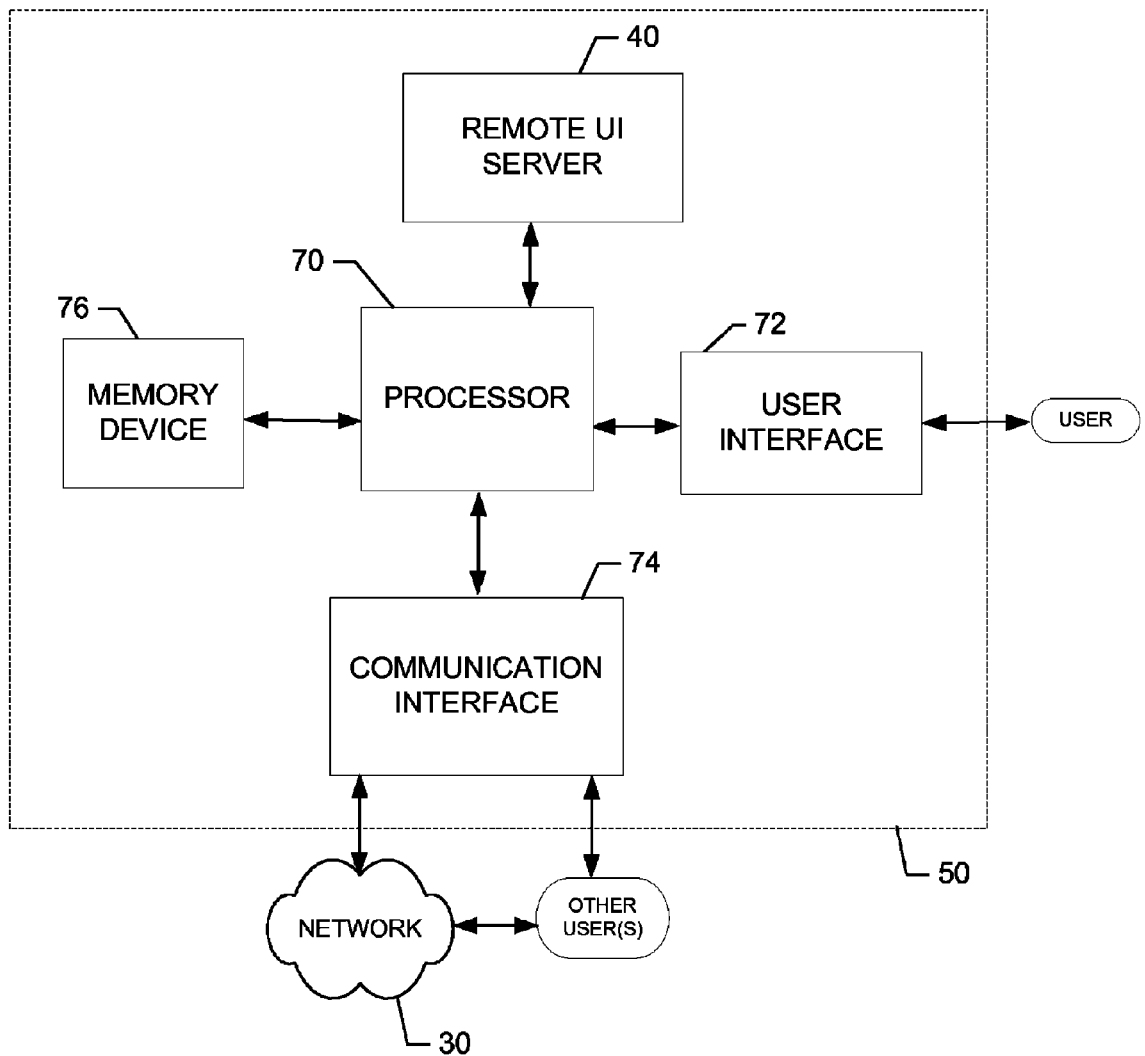
FIG. 2 illustrates a schematic block diagram of an apparatus for providing mobile device interoperability according to an exemplary embodiment of the present invention.

FIG. 2 illustrates a schematic block diagram of an apparatus for enabling the provision of mobile device interoperability with adaptively reduced processing overhead according to an exemplary embodiment of the present invention. An exemplary embodiment of the invention will now be described with reference to FIG. 2, in which certain elements of an apparatus 50 for providing mobile device interoperability with adaptively reduced processing overhead are displayed. The apparatus 50 of FIG. 2 may be employed, for example, on the mobile terminal 10 (and/or the second communication device 20 or the third communication device 25). However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in certain embodiments.

Referring now to FIG. 2, an apparatus for providing mobile device interoperability with adaptively reduced processing overhead is provided. The apparatus 50 may include or otherwise be in communication with a processor 70, a user interface 72, a communication interface 74 and a memory device 76.

The memory device 76 may include, for example, one or more volatile and/or non-volatile memories. In other words, for example, the memory device 76 may be an electronic storage device comprising gates configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a hardware accelerator, a special-purpose computer chip, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing embodiments of the present invention by further configuration of the processor 70 by instructions for performing the algorithms and/or operations described herein. As such, for example, in some cases the processor 70, by execution of the instructions and therefore with the memory device 76, configures the apparatus 50 to perform the corresponding actions associated with the executed instructions. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), Universal Serial Bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms and the corresponding circuitry associated with each such input/output mechanism. In an exemplary embodiment in which the apparatus is embodied as a server or some other network devices, the user interface 72 may be limited, or eliminated. However, in an embodiment in which the apparatus is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the processor 70 may be embodied as, include or otherwise control the remote UI server 40. The remote UI server 40 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the remote UI server 40 as described herein. Thus, in examples in which software is employed, a device or circuitry (e.g., the processor 70 in one example) executing the software forms the structure associated with such means.

Figure 3:
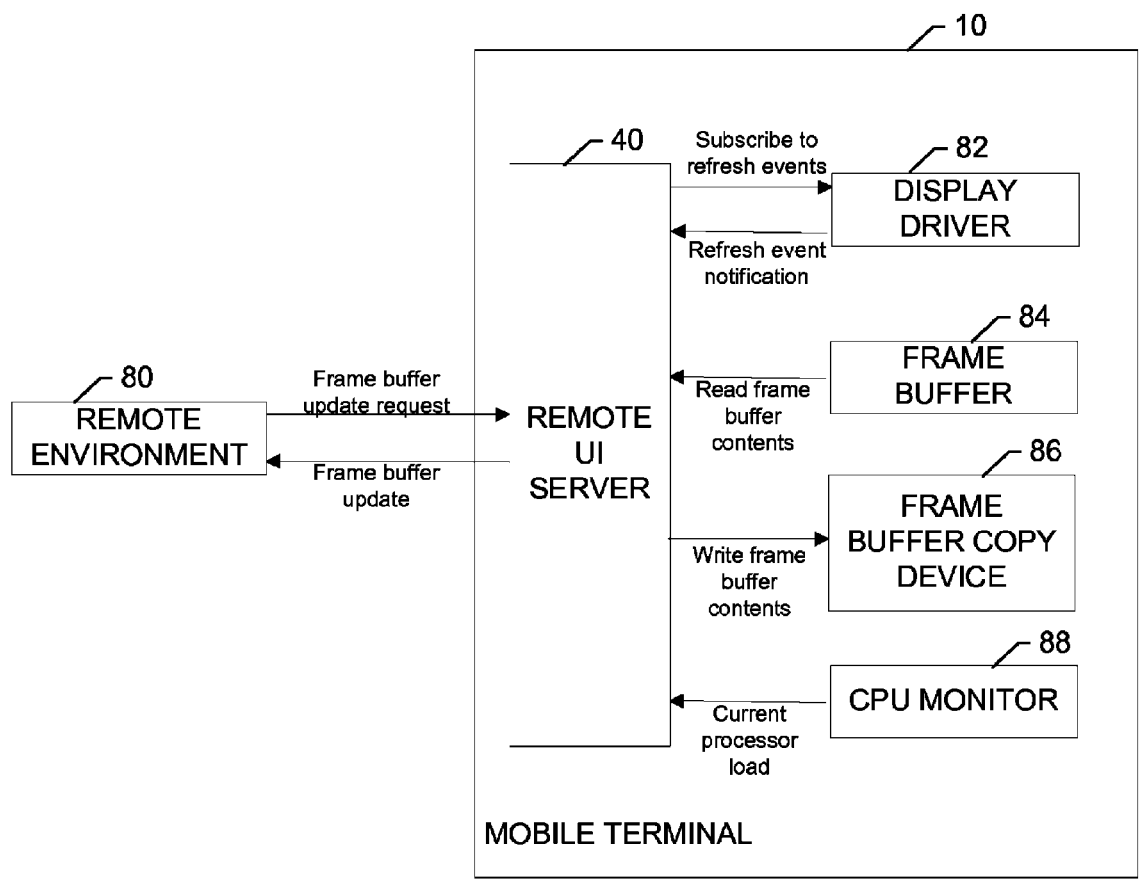
FIG. 3 illustrates a schematic block diagram of interactions of a remote user interface server with other components for providing mobile device interoperability according to an exemplary embodiment of the present invention.
Figure 4:
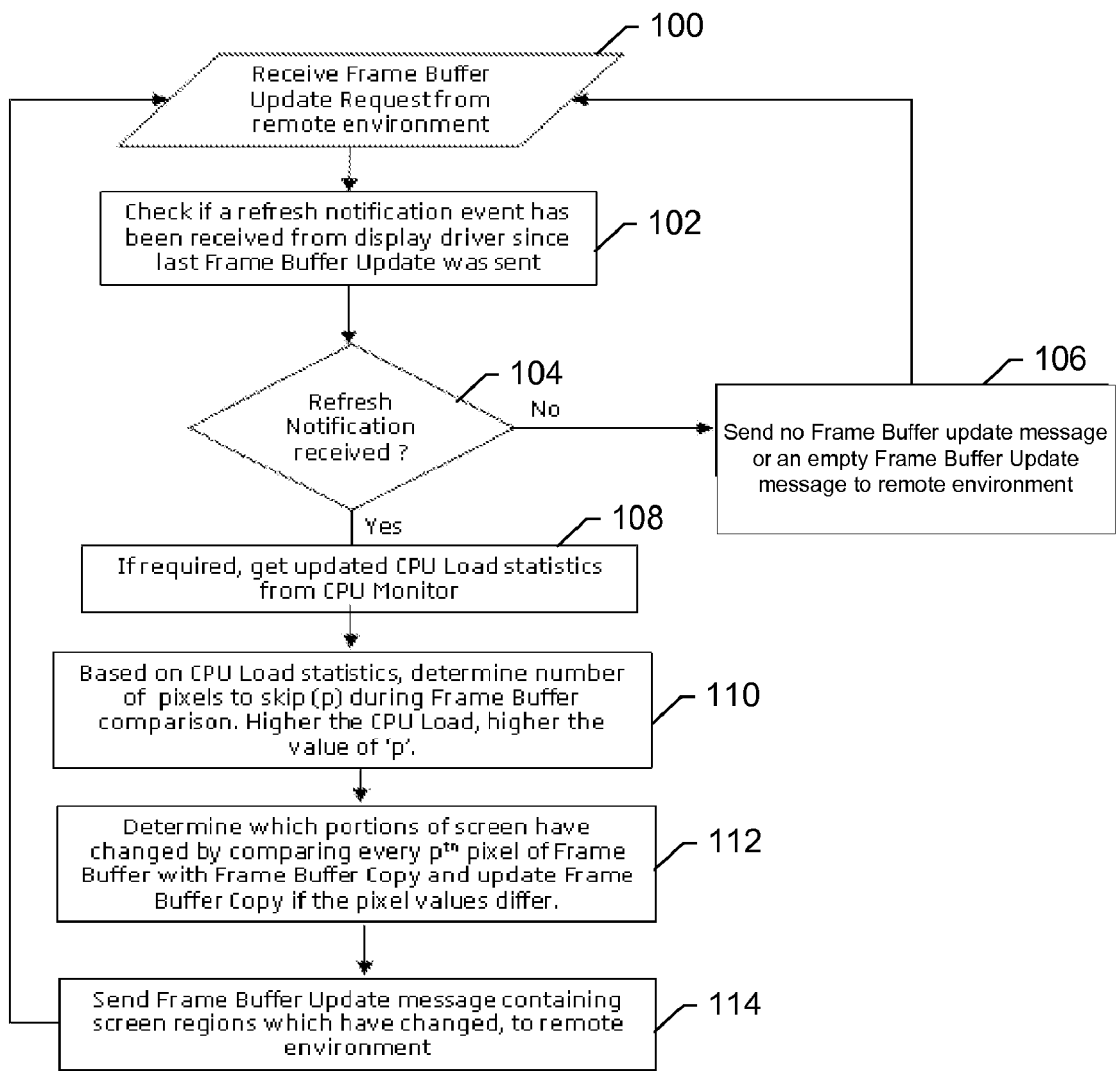
FIG. 4 is a flowchart showing operation of the remote user interface server with other components for providing mobile device interoperability according to an exemplary embodiment of the present invention.

In an exemplary embodiment, the remote UI server 40 may be configured to interface with various components of the mobile terminal 10 and with the remote environment in order to adaptively reduce processing overhead in relation to providing interoperability of the mobile terminal 10 with other devices of the smart space or remote environment. In this regard, FIG. 3 illustrates an example of components with which the remote UI server 40 may communicate in accordance with an exemplary embodiment. FIG. 4 illustrates a flow diagram of operation of the example arrangement shown in FIG. 3 according to an exemplary embodiment.

Within a smart space environment, several devices and services can interact by providing new interaction services and adaptive applications to users based on the capabilities of the various devices and services. There may be several smart devices and interaction widgets within a smart environment and users may use those devices and widgets to address and interact with applications that are possible within such environments. As such, when multiple devices come into proximal contact, an ad hoc smart space may be formed based on combining the individual capabilities of each device. In FIG. 3, a remote environment 80 is used to exemplify the smart space. As such, for example, the remote environment 80 may include one or more devices in communication with each other and also capable of communication with the mobile terminal 10 such as the second and third communication devices 20 and 25. In some cases, the remote environment 80 may include, for example, a vehicle head unit, an in-flight entertainment console, a home entertainment system, a group of devices in a teleconference or video conference or any other group of devices in a smart space.

As shown in FIG. 3, the remote UI server 40 may be in communication with the remote environment 80 and other components of the mobile terminal 10. In this regard, for example, the mobile terminal 10 may include various components such as a display driver 82, a frame buffer 84, a frame buffer copy device 86, and a CPU (central processing unit) monitor 88. Each of the display driver 82, the frame buffer 84, the frame buffer copy device 86, and the CPU monitor 88 may be any means such as a device or circuitry operating in accordance with software or otherwise embodied in hardware or a combination of hardware and software thereby configuring the device or circuitry to perform the corresponding functions of the display driver 82, the frame buffer 84, the frame buffer copy device 86, and the CPU monitor 88, respectively, as described herein.

The display driver 82 may be configured to interface with the display of the user interface 72 in order to provide data for display at the user interface. As such, for example, the display driver 82 may be configured to provide a sequence of video frames in a stream of data to be displayed at the display. The frame buffer 84 may be a memory device or portion of a memory device (e.g., the memory device 76) configured to store one or more frames of data such as frame data defining the stream of data provided by the display driver 82. The frame buffer copy device 86 may also be a memory device or portion of a memory device (e.g., the memory device 76) configured to store one or more frames of data. In this regard, the frame buffer copy device 86 may be configured to store a copy of frame data previously stored in the frame buffer 84.

Thus, for example, the data stored in the frame buffer 84 and the data stored in the frame buffer copy device 86 may be compared in order to determine whether changes have been made to the data to be displayed so that only the changed data may be copied to the remote environment 80 to reduce network overhead as described above. However, according to exemplary embodiments of the present invention, the remote UI server 40 may be configured to utilize an adaptive mechanism to perform the comparison to also reduce processing overhead.

In this regard, the remote UI server 40 may be configured to perform the comparison of data in the frame buffer 84 to the data stored in the frame buffer copy device 86 based on the processor loading of the mobile terminal 10 as determined by the CPU monitor 88. As such, the CPU monitor 88 may be configured to determine CPU loading characteristics and report such characteristics to the remote UI server 40 to enable the remote UI server 40 to determine a portion of the frame data to be skipped during the comparison of current and previous data (or older and more recent data) in the frame buffer 84 and the frame buffer copy device 86. In an exemplary embodiment, the amount of frame data to be skipped in comparison of the older and more recent data may increase as the processor loading increases. FIG. 4 illustrates a flow diagram showing operation of the system shown in FIG. 3 according to an exemplary embodiment.

In an exemplary embodiment, the mobile terminal 10 (e.g., a cellphone, PDA or other device such as those listed above) and the remote environment (e.g., an environment such as a vehicle head unit with associated vehicle sub-systems, home entertainment system, in-flight entertainment system or others) may be in communication with each other. When the mobile terminal 10 is introduced into the smart space, the mobile terminal 10 may export its UI to the remote environment 80 and allows a user to access and control the mobile terminal 10 through the remote environment 80 in essentially the same manner as the user would if the user were physically using the mobile terminal 10 itself. The exporting of the UI may be accomplished by transmitting the contents of the frame buffer 84 of the mobile terminal 10 (either a physical or virtual frame buffer) to the remote environment 80.

In some cases, the export of the UI of the mobile terminal 10 may be accomplished in response to a request from the remote environment for a frame buffer update as shown at operation 100. On receiving the frame buffer update request, the remote UI server 40 of the mobile terminal 10 may be configured to read current frame buffer contents and compares the contents with a previous copy of the frame buffer to enable transmission of the sections or portions of the frame buffer contents that have changed since the last update request. In some cases, for example, the sections to be transmitted may be represented as rectangles, where the coordinates of the corners of the rectangles specify the on-screen boundaries within which the change to contents of the frame buffer 84 has occurred. However, the remote UI server 40 may be further configured to perform the comparison based on processor loading as described in greater detail below.

In this regard, an exemplary embodiment may provide for an adaptive reduction in processing overhead. In order to do so, embodiments of the present invention may utilize information from the CPU monitor 88 and the display driver 82 of the mobile terminal 10 in order to adaptively determine portions of the frame buffer contents to be copied to the remote environment 80. Thus, whereas the operation of accessing and comparing the frame buffer typically involves traversing through the entire frame buffer every time an update request is received and transmitting all the screen regions which have changed, some example embodiments of the present invention may replace this rigorous comparison with a less onerous comparison.

In an exemplary embodiment, as shown in FIG. 3, the remote UI server 40 may initially register with the display driver 82 to request that the display driver 82 send a notification or otherwise notify the remote UI server 40 when the display driver 82 refreshes the contents of the frame buffer 84. Thus, for example, when the frame buffer update request is received at operation 100, the remote UI server 40 may be enabled to check whether a refresh notification event has been received from the display driver since the last frame buffer update was sent at operation 102. If it is determined that a refresh notification is not received at operation 104, then the remote UI server 40 may send an empty frame buffer update message to the remote environment 80 at operation 106. By sending an empty frame buffer update message, savings in processing overhead may be achieved since the remote UI server 40 may be able to preemptively avoid scanning through the frame buffer 84 in situations in which the contents of the frame buffer 84 have not been refreshed. Alternatively, the remote UI server 40 can delay the frame buffer update until a refresh notification has been received.

If a refresh notification is determined to have been received at operation 104, and if required or desired, updated processor loading information (e.g., CPU load statistics) may be received from the CPU monitor 88. In other words, at operation 108, the remote UI server 40 may query the CPU monitor 88 to determine the current processor load of the mobile terminal 10. Based on the processor load, the remote UI server 40 may determine what portion (e.g., what percentage) of the frame buffer 84 content to scan for comparison to the contents of the frame buffer copy device 86 at operation 110. In an exemplary embodiment, the portion to be scanned may be represented by a piece-wise function p(x). In one example, the function p(x) may be determined as follows (however, other values for p(x) could also be employed as this is merely one example and values may be different for different devices based on the processing profiles of the respective devices):

$$0, 0\% \leq \text{CPU Load} \% \leq 10\%$$

$$p(x)=1, 10\% < \text{CPU Load} \% \leq 30\%$$

$$2, 30\% < \text{CPU Load} \% \leq 50\%$$

$$4, 50\% < \text{CPU Load} \% \leq 60\%$$

$$6, 60\% < \text{CPU Load} \% \leq 70\%$$

$$8, 70\% < \text{CPU Load} \% \leq 90\%$$

$$10, \text{CPU Load} \% > 90\%.$$

In an exemplary embodiment, the value of p(x) determines the number of pixels to be skipped while scanning the frame buffer 84. For example, if the value of p(x) is equal to 2, then while traversing and comparing contents of the frame buffer 84 with copy content in the frame buffer copy device 86, for each pixel read and compared, the remote UI server 40 skips the subsequent 2 pixels. Thus, as shown in the example of FIG. 4, based on processor loading, the remote UI server 40 may determine a number of pixels to skip during frame buffer content comparisons (between the frame buffer 84 and the frame buffer copy device 86) at operation 110. At operation 112, a determination may be made as to which portions of the screen have changed based on the comparison in relation to differences between corresponding scanned pixels in each of the frame buffer 84 and the frame buffer copy device 86. At operation 114, a frame buffer update message may be sent to the remote environment 80 including data corresponding to screen regions that have changed.

FIG. 5 shows an example of the process described above for a particular number of skipped pixels (e.g., two) over three successive operations in which the scanned pixel is shifted one to the right for each subsequent iterative determination regarding changes in the frame buffer contents. In this regard, during a first iteration, a first pixel 120 is scanned while a second pixel 122 and a third pixel 124 are skipped. The pattern is then repeated such that a fourth pixel 126 and seventh pixel 132 are scanned while a fifth pixel 128, a sixth pixel 130 and an eighth pixel 134 are not scanned. Then, in a second iteration, the second pixel 122, the fifth pixel 128 and the eighth pixel 134 are scanned, while the first pixel 120, the third pixel 124, the fourth pixel 126, the sixth pixel 130 and the seventh pixel 132 are not scanned. In a third iteration, the third pixel 124 and the sixth pixel 130 are scanned while the first pixel 120, the second pixel 122, the fourth pixel 126, the fifth pixel 128, the seventh pixel 132 and the eighth pixel are not scanned. In the example case of FIG. 5, the effect of the above described operation is illustrated when applied on a frame buffer stored in row-major order, where one can observe that only certain columns of pixels are scanned during a specific iteration in this example. A similar effect may be observed if the operations described are applied on a frame buffer stored in column-major order, except that the traversal may be limited to certain rows of pixels during a specific iteration of processing. Depending on the value of p(x), the remote UI server 40 may only scan the designated columns/rows and updates the corresponding portions indicating differences with the frame buffer copy. The remove UI server 40 may then send the portions (e.g., rectangles) representing the screen regions which have changed to the remote environment 80.

As indicated above, according to this example, for every subsequent processing of a frame buffer update request, the remove UI server 40 may be configured to follow a scan pattern that is shifted from the previous pattern by a predetermined column (in case of row-major storage of frame buffer), as shown in the example of FIG. 5, or by 1 row (in case of column-major storage of frame buffer). Thus, as opposed to the contemporary methods where the entire frame buffer is completely traversed in 1 iteration of a frame buffer update, embodiments of the present invention may provide for the entire frame buffer to be completely traversed in p(x)+1 iterations of frame buffer updates. This modification reduces the processing overhead of traversing the frame buffer, comparing and updating the frame buffer copy provided to the remote environment 80 by a factor of 1/(p(x)+1), which may result in significantly faster response times and rate of updates sent to the remote environment 80 in some cases.

In an exemplary embodiment, the remote UI server 40 may be configured to determine processor loading under predefined circumstances. In this regard, for example, in some cases, if the remote UI server 40 queries the CPU monitor 88 for each received frame buffer update request, certain portions of the frame buffer 84 may never be scanned due to a rapid fluctuation in the value of p(x). As such, it may be possible in some instances that the remote environment 80 may receive a distorted view of the mobile terminal's UI display. To limit the likelihood of such a situation occurring, in one example embodiment the remote UI server 40 is configured to maintain the value of p(x) (e.g., a pixel skip interval) constant until at least one full traversal of the frame buffer 84 has been accomplished using the same value of p(x). In other words, the amount of skipped pixels may be held constant until every pixel has been scanned using the determined skip interval (e.g., by skipping 'k' pixels (for every pixel read) for a total of k+1 iterations). After the entire frame buffer has been scanned with a given skip interval, when a subsequent update request is received that triggers a subsequent iteration, the remote UI server may again query the CPU monitor 88 to determine the new value of p(x) (e.g., value '1'). Then, for the next l+1 iterations (including the current one), the remote UI server may be configured to scan the frame buffer by skipping '1' pixels (for every pixel read), and the process continues.

Accordingly, the remote UI server 40 of an exemplary embodiment may provide improvements in the performance of a mobile terminal in a server role with respect to exporting its UI to a smart space environment. As such, the user experience may be improved. In this regard, for example, the user may experience a faster response time as the number of updates per second may be such that relatively little or even potentially no lag is experienced. Thus, for example, a user accessing and controlling a mobile device through a remote intelligent environment may have the same experience, as if the user was physically interacting with the mobile device itself. Some embodiments of the present invention also provide for a reduction in the processing overhead so that the processor is freed up to do other tasks such as host additional applications thereby also potentially being able to provide the user with a richer experience.

Performance results for some example embodiments have indicated reductions in round-trip-time (RTT) and gains in terms of updates per second over embodiments where conventional techniques are employed. In this regard, for example, in cases where a high throughput wired connection (e.g., USB) or a wireless network connection is provided, incremental updating using an embodiment of the present invention with any of various possible skip intervals employed to selectively scan the frame buffer for changes has produced significant gains over update cases where a full scan of the frame buffer is employed. Moreover, even in situations in which less than fifty percent of the frame buffer is traversed during each iteration, performance results show that coordinates of regions that have changed in the frame buffer are relatively accurately located even though less than fifty percent of the effort expended in a full scan is employed. This phenomenon typically holds true as it is likely that any UI change affects multiple pixels in the same area and thus, skipping a few pixels is not likely to lead to a failure to detect the change.

FIG. 6 is a flowchart of a system, method and program product according to exemplary embodiments of the invention. It will be understood that each block or step of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s) or step(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing mobile device interoperability according to an exemplary embodiment, as shown in FIG. 6 includes receiving a frame buffer update request from a remote environment at operation 200. The method further includes determining (e.g., via a processor of a mobile terminal) a scan interval defining a first portion of the frame buffer over which scanning to determine data changes is to occur and a second portion over which scanning to determine data changes is not to occur at operation 210. The method may further include identifying whether a data change occurs in the first portion of the frame buffer by comparing relatively newer data to relatively older data at operation 220 and updating a selected portion of the frame buffer to the remote environment based on the identifying at operation 230.

In some embodiments, the method may include additional optional operations shown in dashed lines in FIG. 6. As such, for example, the method may further include determining whether a refresh notification event has been received from a display driver of the mobile terminal and determining the scan interval in response to receipt of the refresh notification or sending either one of no frame buffer update message or an empty frame buffer update message to the remote environment in response to lack of receipt of the refresh notification at operation 202. In some cases, the method may further include accessing processor loading information, in which determining the scan interval comprises determining the scan interval based on the processor loading information at operation 206. In some cases, the method may further include determining whether to access processor loading information for use in determining the scan interval at operation 204.

In some embodiments, certain ones of the operations above may be modified or further amplified as described below. In this regard, for example, in some situations, accessing the processor loading information may include accessing processor loading information only in response to an initial iteration of the identifying or in response to an indication that the frame buffer has been entirely traversed using a prior scan interval. In some situations, determining the scan interval may include determining a fixed skip interval of pixels to be skipped after scanning a pixel while traversing the frame buffer. In some cases, communicating the update of the selected portion may include identifying coordinates of a rectangular portion of a frame corresponding to the data change.

In an exemplary embodiment, an apparatus for performing the method of FIG. 6 above may comprise a processor (e.g., the processor 70) configured to perform some or each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, the processor 70, the remote UI server 40, and/or a device or circuit for executing instructions or executing an algorithm for processing information as described above. In this regard, according to an example embodiment, examples of means for performing operations 200-230 may comprise the structure associated with, for example, the processor 70, the remote UI server 40, and/or a device or circuit for executing instructions or executing an algorithm for processing information as described above. As such, in some embodiments, the apparatus for performing the method of FIG. 6 may include at least one processor and at least one memory storing computer program code. The at least one memory and the computer program code may be configured to, with the processor, perform the operations (200-230).

In one example method according to an embodiment of the present invention, the method may include receiving a frame buffer update request from a remote environment, determining, via a processor of a mobile terminal, a scan interval defining a first portion of the frame buffer over which scanning to determine data changes is to occur and a second portion over which scanning to determine data changes is not to occur, identifying whether a data change occurs in the first portion of the frame buffer by comparing relatively newer data to relatively older data, and updating a selected portion of the frame buffer to the remote environment based on the identifying. In some cases, the method may further include determining whether a refresh notification event has been received from a display driver of the mobile terminal and determining the scan interval in response to receipt of the refresh notification or sending either one of no frame buffer update message or an empty frame buffer update message to the remote environment in response to lack of receipt of the refresh notification. In some cases, the method may further include accessing processor loading information, in which determining the scan interval comprises determining the scan interval based on the processor loading information. In some situations, accessing the processor loading information may include accessing processor loading information only in response to an initial iteration of the identifying or in response to an indication that the frame buffer has been entirely traversed using a prior scan interval. In some situations, determining the scan interval may include determining a fixed skip interval of pixels to be skipped after scanning a pixel while traversing the frame buffer. In some cases, the method may further include determining whether to access processor loading information for use in determining the scan interval. In some cases, communicating the update of the selected portion may include identifying coordinates of a rectangular portion of a frame corresponding to the data change.

An example apparatus according to an embodiment of the present invention may include at least one processor and at least one memory including computer program code, the at least one memory and the computer program code configured to, with the at least one processor, cause the apparatus at least to perform receiving a frame buffer update request from a remote environment, determining, via a processor of a mobile terminal, a scan interval defining a first portion of the frame buffer over which scanning to determine data changes is to occur and a second portion over which scanning to determine data changes is not to occur, identifying whether a data change occurs in the first portion of the frame buffer by comparing relatively newer data to relatively older data, and updating a selected portion of the frame buffer to the remote environment based on the identifying. In some cases, the apparatus may be further configured for determining whether a refresh notification event has been received from a display driver of the mobile terminal and determining the scan interval in response to receipt of the refresh notification or sending either one of no frame buffer update message or an empty frame buffer update message to the remote environment in response to lack of receipt of the refresh notification. In some cases, the apparatus may be further configured for accessing processor loading information, in which determining the scan interval comprises determining the scan interval based on the processor loading information. In some situations, accessing the processor loading information may include accessing processor loading information only in response to an initial iteration of the identifying or in response to an indication that the frame buffer has been entirely traversed using a prior scan interval. In some situations, determining the scan interval may include determining a fixed skip interval of pixels to be skipped after scanning a pixel while traversing the frame buffer. In some cases, the apparatus may be further configured for determining whether to access processor loading information for use in determining the scan interval. In some cases, communicating the update of the selected portion may include identifying coordinates of a rectangular portion of a frame corresponding to the data change. In some cases, the apparatus may include a user interface.

An example computer program product according to an exemplary embodiment may include at least one computer-readable storage medium (e.g., a non-transitory storage medium) having computer-executable program code portions stored therein. The computer-executable program code portions may include program code instructions for receiving a frame buffer update request from a remote environment, program code instructions for determining a scan interval defining a first portion of the frame buffer over which scanning to determine data changes is to occur and a second portion over which scanning to determine data changes is not to occur, program code instructions for identifying whether a data change occurs in the first portion of the frame buffer by comparing relatively newer data to relatively older data, and program code instructions for updating a selected portion of the frame buffer to the remote environment based on the identifying. In some cases, the computer program product may further include instructions for determining whether a refresh notification event has been received from a display driver of the mobile terminal and determining the scan interval in response to receipt of the refresh notification or sending either one of no frame buffer update message or an empty frame buffer update message to the remote environment in response to lack of receipt of the refresh notification. In some cases, the computer program product may further include instructions for accessing processor loading information, in which determining the scan interval comprises determining the scan interval based on the processor loading information. In some situations, accessing the processor loading information may include accessing processor loading information only in response to an initial iteration of the identifying or in response to an indication that the frame buffer has been entirely traversed using a prior scan interval. In some situations, determining the scan interval may include determining a fixed skip interval of pixels to be skipped after scanning a pixel while traversing the frame buffer. In some cases, the computer program product may further include instructions for determining whether to access processor loading information for use in determining the scan interval. In some cases, communicating the update of the selected portion may include identifying coordinates of a rectangular portion of a frame corresponding to the data change.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving a frame buffer update request from a remote environment;
   determining, via a processor of a mobile terminal, a scan interval defining a first portion of the frame buffer over which scanning to determine data changes is to occur and a second portion over which scanning to determine data changes is not to occur;
   identifying whether a data change occurs in the first portion of the frame buffer by comparing relatively newer data to relatively older data; and
   updating a selected portion of the frame buffer to the remote environment based on the identifying.

2. The method of claim 1, further comprising determining whether a refresh notification event has been received from a display driver of the mobile terminal and determining the scan interval in response to receipt of the refresh notification or sending either one of no frame buffer update message or an empty frame buffer update message to the remote environment in response to lack of receipt of the refresh notification.

3. The method of claim 1, further comprising accessing processor loading information, wherein determining the scan interval comprises determining the scan interval based on the processor loading information.

4. The method of claim 3, wherein accessing the processor loading information comprises accessing processor loading information only in response to an initial iteration of the identifying or in response to an indication that the frame buffer has been entirely traversed using a prior scan interval.

5. The method of claim 1, wherein determining the scan interval comprises determining a fixed skip interval of pixels to be skipped after scanning a pixel while traversing the frame buffer.

6. The method of claim 1, further comprising determining whether to access processor loading information for use in determining the scan interval.

7. The method of claim 1, wherein communicating the update of the selected portion comprises identifying coordinates of a rectangular portion of a frame corresponding to the data change.

8. An apparatus comprising at least one processor and at least one memory including computer program code, the at least one memory and the computer program code configured to, with the at least one processor, cause the apparatus to perform at least the following:
   receive a frame buffer update request from a remote environment;
   determine a scan interval defining a first portion of the frame buffer over which scanning to determine data changes is to occur and a second portion over which scanning to determine data changes is not to occur;
   identify whether a data change occurs in the first portion of the frame buffer by comparing relatively newer data to relatively older data; and
   update a selected portion of the frame buffer to the remote environment based on the identifying.

9. The apparatus of claim 8, wherein the apparatus is configured to determine whether a refresh notification event has been received from a display driver of a mobile terminal and determine the scan interval in response to receipt of the refresh notification or send either one of no frame buffer update message or an empty frame buffer update message to the remote environment in response to lack of receipt of the refresh notification.

10. The apparatus of claim 8, wherein the apparatus is further configured to access processor loading information, wherein determining the scan interval comprises determining the scan interval based on the processor loading information.

11. The apparatus of claim 10, wherein the apparatus is configured to access the processor loading information by accessing processor loading information only in response to an initial iteration of the identifying or in response to an indication that the frame buffer has been entirely traversed using a prior scan interval.

12. The apparatus of claim 8, wherein the apparatus is configured to determine the scan interval by determining a fixed skip interval of pixels to be skipped after scanning a pixel while traversing the frame buffer.

13. The apparatus of claim 8, wherein the apparatus is further configured to determine whether to access processor loading information for use in determining the scan interval.

14. The apparatus of claim 8, wherein the apparatus is configured to communicate the update of the selected portion by identifying coordinates of a rectangular portion of a frame corresponding to the data change.

15. The apparatus of claim 8, wherein the apparatus further includes a user interface.

16. A computer program product comprising at least one computer-readable storage medium having computer-executable program code portions stored therein, the computer-executable program code portions comprising:
   program code instructions for receiving a frame buffer update request from a remote environment;
   program code instructions for determining a scan interval defining a first portion of the frame buffer over which scanning to determine data changes is to occur and a second portion over which scanning to determine data changes is not to occur;
   program code instructions for identifying whether a data change occurs in the first portion of the frame buffer by comparing relatively newer data to relatively older data; and program code instructions for updating a selected portion of the frame buffer to the remote environment based on the identifying.

17. The computer program product of claim 16, further comprising program code instructions for determining whether a refresh notification event has been received from a display driver of a mobile terminal and determining the scan interval in response to receipt of the refresh notification or sending either one of no frame buffer update message or an empty frame buffer update message to the remote environment in response to lack of receipt of the refresh notification.

18. The computer program product of claim 16, further comprising program code instructions for accessing processor loading information, wherein determining the scan interval comprises determining the scan interval based on the processor loading information.

19. The computer program product of claim 18, wherein program code instructions for accessing the processor loading information include instructions for accessing processor loading information only in response to an initial iteration of the identifying or in response to an indication that the frame buffer has been entirely traversed using a prior scan interval.

20. The computer program product of claim 16, wherein program code instructions for determining the scan interval include instructions for determining a fixed skip interval of pixels to be skipped after scanning a pixel while traversing the frame buffer.

\* \* \* \* \*